(12) United States Patent
Sumida et al.

(10) Patent No.: US 7,438,746 B2
(45) Date of Patent: Oct. 21, 2008

(54) OFF-GAS FEED METHOD AND TARGET GAS PURIFICATION SYSTEM

(75) Inventors: Toshihiko Sumida, Kako-gun (JP);
Hiroaki Sasano, Kako-gun (JP);
Masanori Miyake, Kako-gun (JP)

(73) Assignee: Sumitomo Seika Chemicals, Co., Ltd., Hyogo (JP)

( * ) Notice: Subject to any disclaimer, the term of this patent is extended or adjusted under 35 U.S.C. 154(b) by 548 days.

(21) Appl. No.: 10/546,713

(22) PCT Filed: Feb. 16, 2004

(86) PCT No.: PCT/JP2004/001673

§ 371 (c)(1),
(2), (4) Date: Aug. 24, 2005

(87) PCT Pub. No.: WO2004/076030

PCT Pub. Date: Sep. 10, 2004

(65) Prior Publication Data

US 2006/0236860 A1    Oct. 26, 2006

(30) Foreign Application Priority Data

Feb. 25, 2003    (JP)    ............................. 2003-047647

(51) Int. Cl.
*B01D 53/047*    (2006.01)

(52) U.S. Cl. ............................................. 95/98; 95/103

(58) Field of Classification Search ...................... 95/96, 95/98, 103–105, 143, 148; 96/121, 122, 96/130
See application file for complete search history.

(56) References Cited

U.S. PATENT DOCUMENTS

| 4,834,780 A | * | 5/1989 | Benkmann | ..................... 95/98 |
| 6,048,384 A | | 4/2000 | Smolarek | |
| 6,454,838 B1 | * | 9/2002 | Xu et al. | ........................ 95/98 |
| 6,913,638 B2 | * | 7/2005 | Sumida et al. | .................. 95/98 |

FOREIGN PATENT DOCUMENTS

| JP | 11-239711 | 9/1999 |
| JP | 2000-313605 | 11/2000 |
| JP | 2002-355521 | 12/2001 |
| JP | 2002-355522 | 12/2002 |

* cited by examiner

*Primary Examiner*—Frank M Lawrence
(74) *Attorney, Agent, or Firm*—Hamre, Schumann, Mueller & Larson, P.C.

(57) ABSTRACT

The invention provides an off-gas feeding method that supplies the off-gas discharged from a plurality of adsorption towers (A, B, C) to an off-gas consumption unit (1), when performing a pressure swing adsorption process of repeating a cycle including a plurality of steps, to enrich and separate the target gas out of a gas mixture in the adsorption towers (A, B, C) loaded with an adsorbent. The method allows at least one of the plurality of adsorption towers (A, B, C) to discharge the off-gas, in all the steps included in the cycle, so as to continue to supply the off-gas to the off-gas consumption unit (1) without interruption.

10 Claims, 7 Drawing Sheets

| Step | 1 | 2 | 3 | 4 | 5 | 6 | 7 | 8 | 9 |
|---|---|---|---|---|---|---|---|---|---|
| Adsorption Tower A | AD | AD | AD | First DP | Second DP | DE | SC | First PR | Second PR |
| Adsorption Tower B | SC | First PR | Second PR | Second PR | AD | AD | AD | AD | First DP | Second DP | DE |
| Adsorption Tower C | First DP | Second DP | DE | SC | First PR | Second PR | AD | AD | AD |
| Valve a | OPEN | OPEN | OPEN | CLOSED | CLOSED | CLOSED | CLOSED | CLOSED | CLOSED |
| Valve b | CLOSED | CLOSED | CLOSED | CLOSED | OPEN | OPEN | OPEN | CLOSED | CLOSED |
| Valve c | CLOSED | CLOSED | CLOSED | OPEN | OPEN | OPEN | CLOSED | CLOSED | CLOSED |
| Valve d | OPEN | CLOSED | CLOSED | CLOSED | CLOSED | CLOSED | OPEN | OPEN | OPEN |
| Valve e | CLOSED | CLOSED | OPEN | OPEN | CLOSED | CLOSED | CLOSED | OPEN | OPEN |
| Valve f | CLOSED | OPEN | OPEN | CLOSED | CLOSED | CLOSED | OPEN | CLOSED | CLOSED |
| Valve g | CLOSED | CLOSED | CLOSED | CLOSED | OPEN | CLOSED | CLOSED | CLOSED | CLOSED |
| Valve h | CLOSED | OPEN | OPEN | CLOSED | CLOSED | CLOSED | CLOSED | CLOSED | CLOSED |
| Valve i | OPEN | OPEN | OPEN | CLOSED | CLOSED | CLOSED | CLOSED | CLOSED | CLOSED |
| Valve j | OPEN | OPEN | OPEN | OPEN | OPEN | OPEN | OPEN | OPEN | OPEN |
| Valve k | CLOSED | CLOSED | CLOSED | CLOSED | CLOSED | OPEN | CLOSED | OPEN | CLOSED |
| Valve l | CLOSED | CLOSED | CLOSED | OPEN | OPEN | OPEN | CLOSED | CLOSED | CLOSED |
| Valve m | CLOSED | OPEN | OPEN | OPEN | OPEN | OPEN | CLOSED | CLOSED | CLOSED |
| Valve n | OPEN | OPEN | OPEN | CLOSED | CLOSED | CLOSED | CLOSED | CLOSED | CLOSED |
| Valve o | CLOSED | CLOSED | CLOSED | CLOSED | CLOSED | CLOSED | CLOSED | CLOSED | CLOSED |
| Valve p | OPEN | OPEN | OPEN | OPEN | OPEN | CLOSED | OPEN | OPEN | OPEN |
| Valve q | CLOSED | CLOSED | OPEN | CLOSED | CLOSED | OPEN | CLOSED | CLOSED | OPEN |

FIG. 3a Step 1

FIG. 3b Step 2

FIG. 3c Step 3

FIG. 3d Step 4

FIG. 3e Step 5

FIG. 3f Step 6

FIG. 3g Step 7

FIG. 3h Step 8

FIG. 3i Step 9

| Step | 1' | 2' | 3' | 4' | 5' | 6' | 7' | 8' | 9' | 10' | 11' | 12' |
|---|---|---|---|---|---|---|---|---|---|---|---|---|
| Adsorption Tower A | AD | AD | AD | First DP | Second DP | DE | SC | First PR | WA | Second PR | Second PR | Second PR |
| Adsorption Tower B | Second PR | Second PR | Second PR | AD | AD | AD | First DP | Second DP | DE | SC | First PR | WA |
| Adsorption Tower C | SC | First PR | WA | Second PR | Second PR | Second PR | AD | AD | AD | First DP | Second DP | DE |
| Adsorption Tower D | First DP | Second DP | DE | SC | First PR | WA | Second PR | Second PR | Second PR | AD | AD | AD |

FIG. 7a Step I

FIG. 7b Step II

FIG. 7c Step III

FIG. 7d Step IV

FIG. 7e Step V

FIG. 7f Step VI

FIG. 7g Step VII

FIG. 7h Step VIII

FIG. 7i Step IX

PRIOR ART

OFF-GAS FEED METHOD AND TARGET GAS PURIFICATION SYSTEM

TECHNICAL FIELD

The present invention relates to a technique of recycling off-gas discharged when enriching and separating target gas out of a gas mixture by a pressure swing adsorption process. More particularly, the present invention relates to a method of supplying off-gas to an off-gas consumption unit, and to a purification system for target gas.

BACKGROUND ART

Conventional methods of enriching and separating target gas such as hydrogen gas out of a gas mixture include a pressure swing adsorption process (hereinafter abbreviated as PSA process). The PSA process employs two to four adsorption towers in which an adsorbent is loaded, in each of which a cycle including an adsorption step, a depressurizing step, a desorption step, a scavenging step and a pressurizing step is repetitively performed. The technique of enriching and separating target gas out of a gas mixture by the PSA process can be found, for example, in JP-A 2000-313605.

The cited document discloses a technique of repeating a cycle including steps I to IX shown in FIGS. 7a to 7i, with an apparatus including three adsorption towers A, B, C respectively containing an appropriate adsorbent, so as to enrich and separate target gas and supply off-gas discharged from the adsorption towers A, B, C to an off-gas consumption unit (reformer). Specifically, these steps are carried out as follows.

Figure 7A:
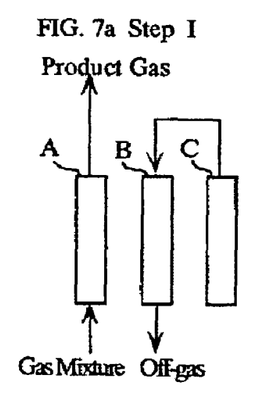
FIGS. 7a to 7i are block diagrams respectively showing the gas flow directions in steps I to IX for enriching and separating the target gas, with a triple-tower PSA system for carrying out a conventional off-gas feeding method.

In the step I shown in FIG. 7a, the adsorption step is performed in the adsorption tower A; the scavenging step is performed in the adsorption tower B; and a first depressurizing step is performed in the adsorption tower C. Specifically, a gas mixture is introduced into the adsorption tower A, so that an unnecessary gas component is removed by the adsorbent in the tower, and a product gas (target gas that has been enriched and separated) is discharged out of the tower. In the adsorption tower C, the adsorption step (see the step IX described later) has just finished, and residual gas led out from the tower C is introduced into the adsorption tower B performing the scavenging step, to serve as scavenging gas. Accordingly, the scavenging of the adsorption tower B can be simultaneously performed with the depressurizing of the adsorption tower C.

Figure 7B:
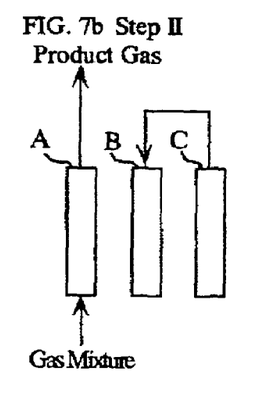

In the step II shown in FIG. 7b, the adsorption step is performed in the adsorption tower A; a first pressurizing step (pressure equalizing step) is performed in the adsorption tower B; and a second depressurizing step (pressure equalizing step) is performed in the adsorption tower C. Specifically, the adsorbent continues to remove the unnecessary gas component in the adsorption tower A as in the step I, so as to discharge the product gas out of the tower. The adsorption tower C continues to introduce the residual gas into the adsorption tower B as in the step I, so that the adsorption tower B, upon finishing the scavenging step (step I), accumulates the gas supplied from the adsorption tower C. Accordingly, the pressurizing of the adsorption tower B is simultaneously performed with the depressurizing of the adsorption tower C, so that the pressure in the adsorption tower B and the adsorption tower C may be equalized.

Figure 7C:
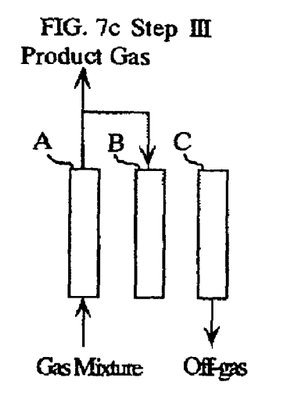

In the step III shown in FIG. 7c, a adsorption step is performed in the adsorption tower A; a second pressurizing step is performed in the adsorption tower B; and a desorption step (blowdown step) is performed in the adsorption tower C. Specifically, the gas mixture is continuously introduced into the adsorption tower A as in the steps I and II, and the product gas is discharged out of the tower. At this stage, a portion of the product gas is introduced into the adsorption tower B, so that pressurization is continued in the adsorption tower B. From the adsorption tower C, the residual gas is discharged out of the tower, which causes a depressurizing effect so that the unnecessary gas component desorbed from the adsorbent is discharged out of the tower.

Figure 7D:
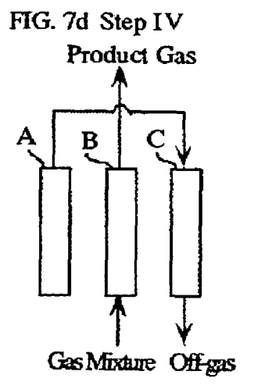
Figure 7E:
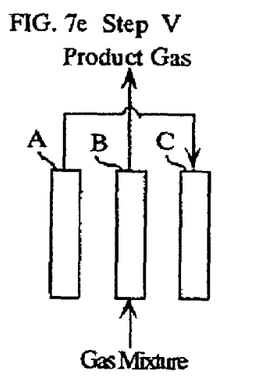
Figure 7F:
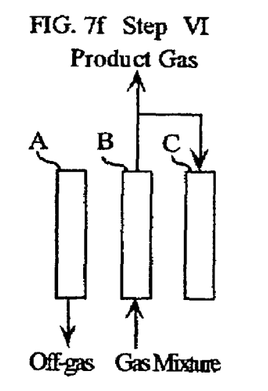

Through the steps IV to VI shown in FIGS. 7d to 7f, the first depressurizing step, the second depressurizing step and the desorption step are successively performed in the adsorption tower A, as in the adsorption tower C through the steps I to III. In the adsorption tower B, the adsorption step is continuously performed as in the adsorption tower A through the steps I to III. In the adsorption tower C, the scavenging step, the first pressurizing step and the second pressurizing step are successively performed, as in the adsorption tower B through the steps I to III.

Figure 7G:
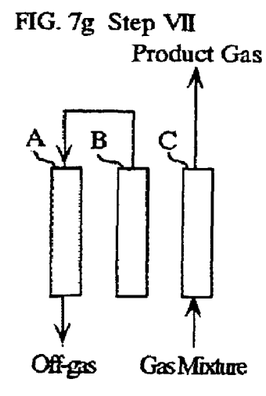
Figure 7H:
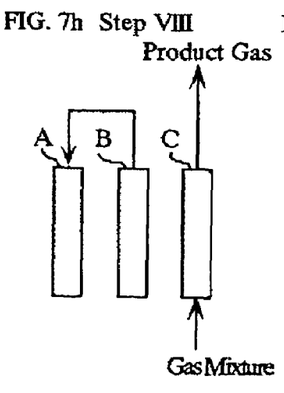
Figure 7I:
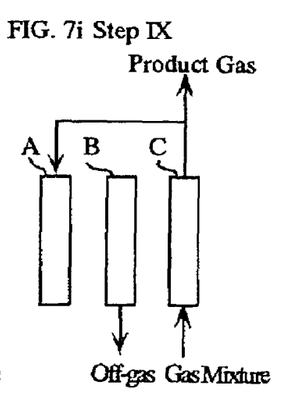

Through the steps VII to IX shown in FIGS. 7g to 7i, the scavenging step, the first pressurizing step and the second pressurizing step are successively performed in the adsorption tower A, as in the adsorption tower B through the steps I to III. In the adsorption tower B, the first depressurizing step, the second depressurizing step and the desorption step are successively performed, as in the adsorption tower C through the steps I to III. In the adsorption tower C, the adsorption step is continuously performed as in the adsorption tower A through the steps I to III.

Repeating the foregoing steps I to IX in the adsorption towers A, B, C leads to removal of unnecessary gas component from the gas mixture, and to continuous extraction of the product gas containing a high concentration of the target gas.

Meanwhile, the off-gas discharged from the adsorption tower B in the step I, adsorption tower C in the step III, adsorption tower C in the step IV, adsorption tower A in the step VI, adsorption tower A in the step VII, and adsorption tower B in the step IX is supplied to the reformer as a fuel, after being temporarily stored in an off-gas reservoir tank (not shown). The off-gas reservoir tank is installed in order to store a portion of the off-gas discharged in the above steps so as to secure the continuous supply of the off-gas to the reformer without interruption in the steps II, V and VIII, in which none of the adsorption towers discharges the off-gas.

However, the off-gas reservoir tank normally has a capacity more than five times as large as that of the adsorption tower, and has hence been a great obstacle in achieving further reduction in dimensions of the target gas enrichment and separation system. Besides, according to the technique disclosed in the cited document, reducing the capacity of the off-gas reservoir tank inevitably incurs an increase in pressure fluctuation, and is hence difficult to achieve.

DISCLOSURE OF THE INVENTION

Accordingly, it is an object of the present invention to provide an off-gas feeding method including a target gas enriching and separating system of reduced dimensions, yet capable of supplying off-gas discharged from a plurality of adsorption towers without interruption, when performing a PSA process to enrich and separate the target gas out of a gas mixture in the adsorption towers.

It is another object of the present invention to provide a target gas purification system appropriate for such an off-gas feeding method.

A first aspect of the present invention provides an off-gas feeding method for supplying the off-gas discharged from a plurality of adsorption towers to an off-gas consumption unit, when performing a pressure swing adsorption process of repeating a cycle including a plurality of steps, to enrich and separate target gas out of a gas mixture in the adsorption towers loaded with an adsorbent. The method comprises causing at least one of the adsorption towers to discharge the off-gas, in all the steps included in the cycle, so as to continue to supply the off-gas to the off-gas consumption unit without interruption.

By the method thus arranged, since the off-gas is constantly discharged out of the towers, the off-gas can be supplied to the off-gas consumption unit without interruption, without the need of storing a large amount of the off gas in an off-gas reservoir tank. Accordingly, the off-gas reservoir tank, which is a greatest obstacle in reducing the dimensions of the target gas purification system, can be made smaller, or even omitted, which naturally leads to reduction in dimensions of the target gas purification system.

Preferably, the method may include controlling the flow rate of the off-gas supplied to the off-gas consumption unit. Such arrangement allows alleviating an abrupt fluctuation in discharging pressure or composition of the off-gas, which may take place at a transition of the steps or with the lapse of time. Therefore, the off-gas can be supplied to the consumption unit under a stable status.

Preferably, the flow rate may be controlled by adjusting the opening extent of a flow control valve located in the gas flow path connecting the adsorption towers to the off-gas consumption unit.

According to a preferred embodiment of the present invention, each of the adsorption towers repeats the cycle which includes an adsorption step of adsorbing an unnecessary gas component in the gas mixture with the adsorbent so as to discharge a product gas containing a higher concentration of the target gas, a first depressurizing step of reducing the pressure in the adsorption tower to a first intermediate pressure, a second depressurizing step of reducing the pressure in the adsorption tower to a second intermediate pressure, a desorption step of desorbing and discharging the unnecessary gas component from the adsorbent, a scavenging step of introducing scavenging gas into the adsorption tower so as to discharge residual gas in the tower, and a pressurizing step of increasing the pressure in the adsorption tower. The residual gas discharged through a product gas outlet of the adsorption tower performing the second depressurizing step is introduced to another adsorption tower performing the pressurizing step, and the off-gas is supplied to the off-gas consumption unit through a gas mixture inlet of the adsorption tower performing the second depressurizing step.

Preferably, the adsorption towers may supply the off-gas to the off-gas consumption unit during the second depressurizing step, the desorption step and the scavenging step.

Preferably, the flow rate of the off-gas supplied to the off-gas consumption unit may be controlled by the flow control valve located in the gas flow path connecting the adsorption towers to the off-gas consumption unit. The opening extent of the flow control valve is set to be largest in the scavenging step and smallest in the second depressurizing step, and to gradually increase in the desorption step.

According to another preferred embodiment of the present invention, each of the adsorption towers repeats the cycle which includes an adsorption step of adsorbing an unnecessary gas component in the gas mixture with the adsorbent so as to discharge a product gas containing a higher concentration of the target gas, a first depressurizing step of reducing the pressure in the adsorption tower to a first intermediate pressure, a second depressurizing step of reducing the pressure in the adsorption tower to a second intermediate pressure, a desorption step of desorbing and discharging the unnecessary gas component from the adsorbent, a scavenging step of introducing scavenging gas into the adsorption tower so as to discharge residual gas in the tower, a first pressurizing step of increasing the pressure in the adsorption tower, a waiting step of closing both of the gas mixture inlet and the product gas outlet of the adsorption tower, and a second pressurizing step of further increasing the pressure in the adsorption tower. The residual gas discharged through a product gas outlet of the adsorption tower performing the second depressurizing step is introduced to another adsorption tower performing the first pressurizing step, and the off-gas is supplied to the off-gas consumption unit through a gas mixture inlet of the adsorption tower performing the second depressurizing step.

Preferably, the off-gas consumption unit may serve as a combustion unit of a reformer that produces the gas mixture.

Preferably, the target gas may be hydrogen gas, and the gas mixture may contain the hydrogen gas and a flammable gas component other than the hydrogen gas.

A second aspect of the present invention provides a target gas purification system comprising a reformer that includes a combustion unit and reforms a material gas to produce a gas mixture containing the target gas; a purifier that performs a pressure swing adsorption process of repeating a cycle including a plurality of steps, to enrich and separate the target gas out of the gas mixture in a plurality of adsorption towers loaded with an adsorbent; and an off-gas supplier that supplies the off-gas discharged from the purifier to the combustion unit as a fuel. The supplier includes a discharge controller that causes at least one of the plurality of adsorption towers in all the steps included in the cycle, so as to continue to supply the off-gas to the combustion unit without interruption.

Preferably, the supplier may supply the off-gas to the combustion unit without the intermediation of an off-gas reservoir tank that temporarily stores the off-gas.

Preferably, the discharge controller may include a flow control valve located on a gas flow path through which the gas is supplied to and discharged from the respective adsorption towers, and an opening controller that controls the opening extent of the flow control valve.

The above and other features and advantages of the present invention will become more apparent from the following embodiments described based on the accompanying drawings.

BEST MODE FOR CARRYING OUT THE INVENTION

Referring to the accompanying drawings, preferred embodiments of the present invention will be described in details hereunder.

Figure 1:
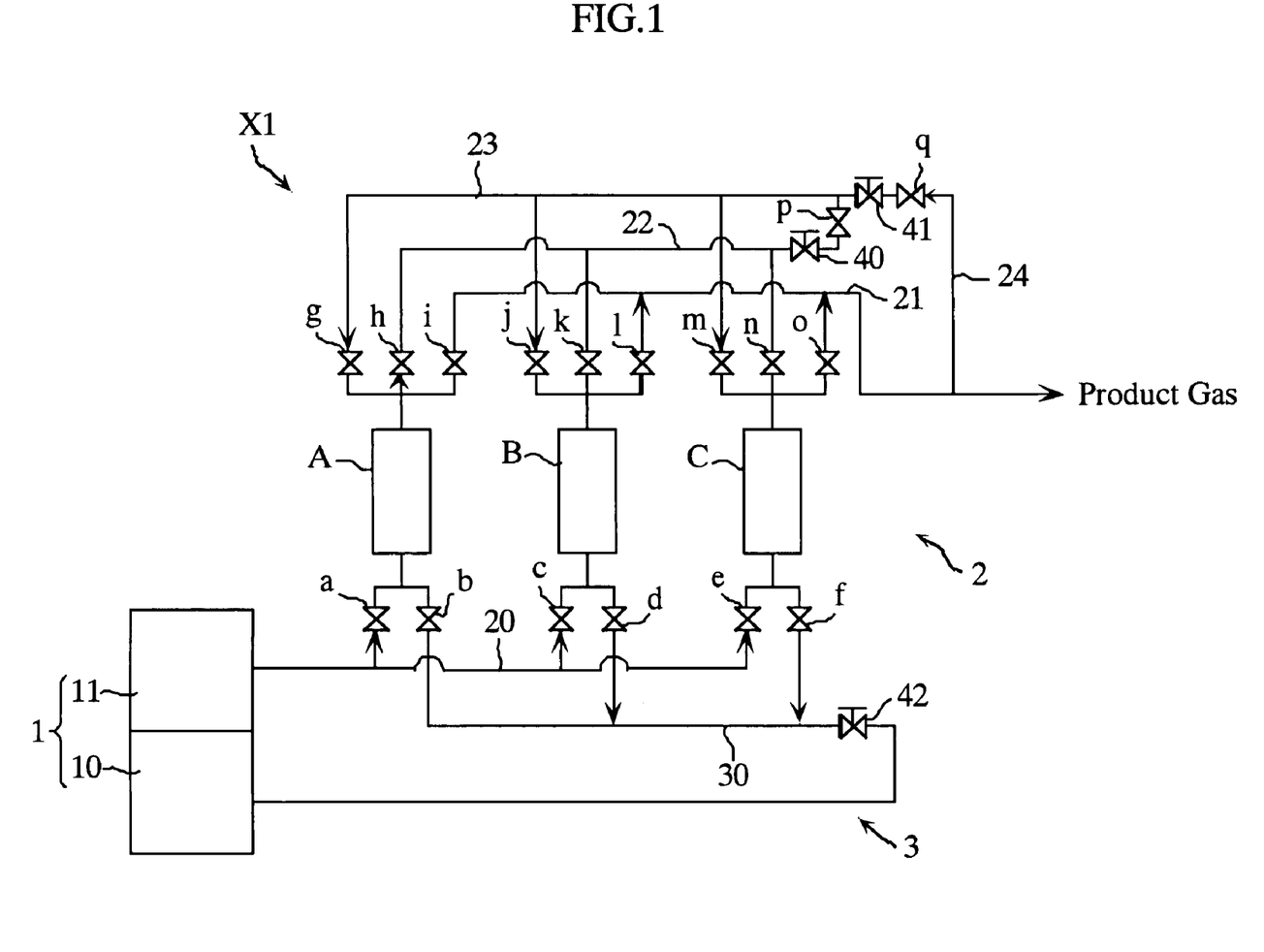
FIG. 1 is a schematic diagram showing a configuration of a triple-tower PSA system for carrying out an off-gas feeding method according to a first embodiment of the present invention.

An off-gas feeding method according to the first embodiment of the present invention may be carried out with a triple-tower PSA system shown in FIG. 1. The triple-tower PSA system X1 shown in FIG. 1 principally includes a reformer 1, a purifier 2, and an off-gas supplier 3. The reformer 1 includes a combustion unit 10 and a reforming unit 11. The purifier 2 includes three adsorption towers A, B, C, a gas mixture piping 20, a product gas piping 21, a residual gas recovery piping 22, a gas introduction piping 23 and a product gas reverse flow piping 24. The off-gas supplier 3 includes an off-gas feed piping 30.

Each of the adsorption towers A, B, C is loaded with an adsorbent. Examples of preferable adsorbent include carbon (suitable for removing carbon oxide gas or methane gas), zeolite (suitable for removing carbon monoxide gas or nitrogen gas), and alumina (suitable for removing vapor). Obviously two or more of the enumerated adsorbents may be employed in combination, and other adsorbent than these may also be employed.

The pipings 20 to 24 are respectively provided with an automatic valve a to q. The residual gas recovery piping 22, product gas reverse flow piping 24 and off-gas feed piping 30 are respectively provided with a flow control valve 40, 41, 42. Further, a controller (not shown) is provided for controlling the open/close operation of the automatic valves a to q, as well as the opening extent of the flow control valves 40, 41, 42. As will be described below, switching the automatic valves a to q to open or close, and controlling the opening extent of the flow control valves 40, 41, 42 causes the respective adsorption towers A, B, C to perform an adsorption step, a first depressurizing step, a second depressurizing step, a desorption step, a scavenging step, a first pressurizing step and a second pressurizing step.

Figure 2:
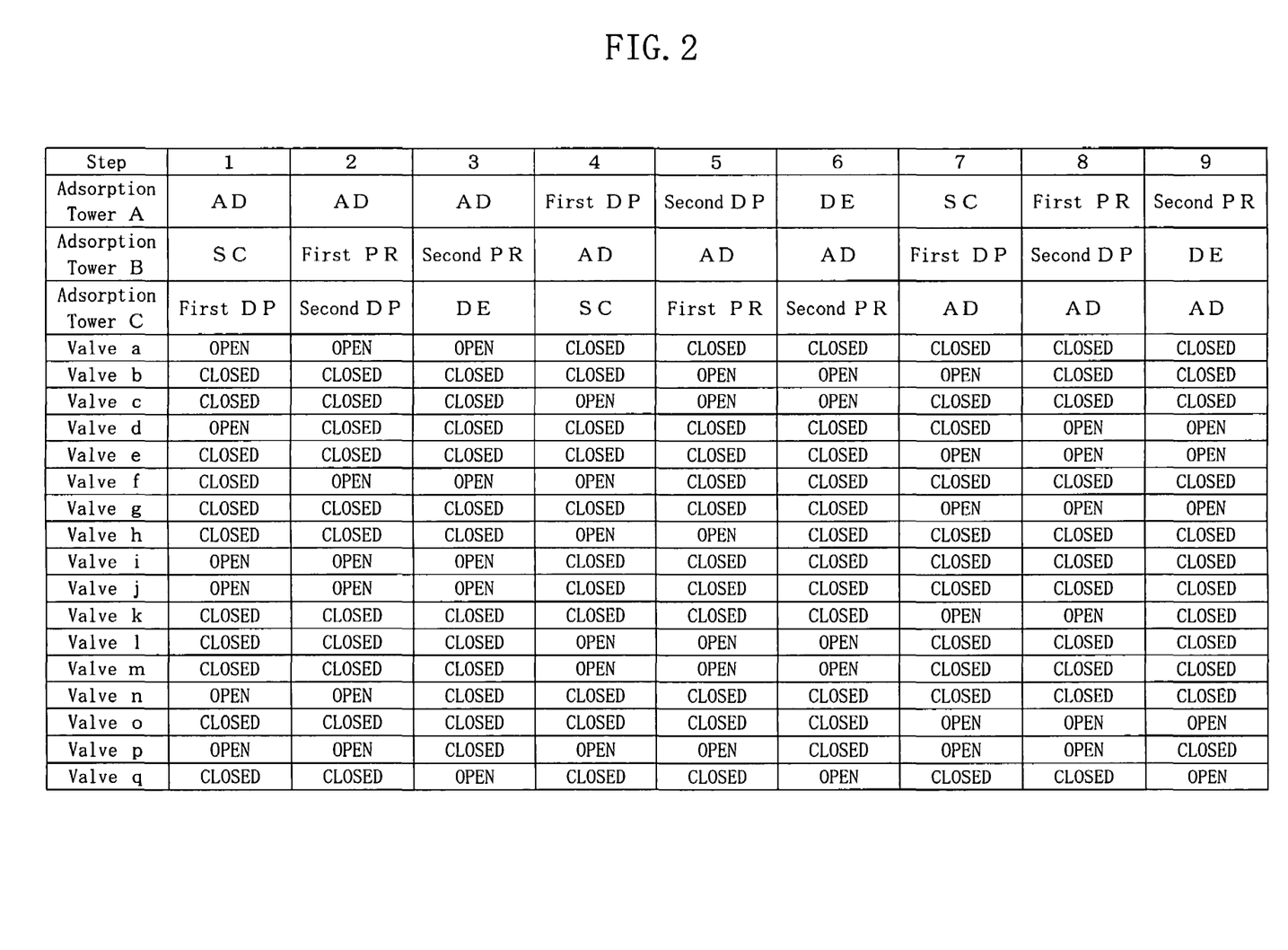
FIG. 2 is a cross-reference table specifying a process performed in the adsorption towers and a timing for opening and closing valves, with respect to steps 1 to 9 for enriching and separating the target gas with the triple-tower PSA system.

Specifically, such steps (steps 1 to 9) are performed in the adsorption towers, in a timing specified in FIG. 2. The open/close state of the automatic valves a to q in the respective steps is specified in FIG. 2, and a flow of the gas in each step is schematically illustrated in FIGS. 3a to 3i. FIG. 4 is a graph showing an opening control pattern of the flow control valve 42, through the steps 1 to 3. According to the example of FIG. 4, the opening extent of the flow control valve 42 is 100% (constant) in the step 1, 10% (constant) in the step 2 and substantially linearly increasing with time from 40% (beginning of the step 3) to 100% (end of the step 3), through the step 3. The opening extent of the flow control valve 42 may be otherwise determined as desired depending on the need. Likewise, the opening extent of the flow control valves 40, 41 may also be determined as desired depending on the need.

In FIG. 2, the following abbreviations are used.
AD: Adsorption Step
First DP: First Depressurizing Step
Second DP: Second Depressurizing Step
DE: Desorption Step
SC: Scavenging Step
First PR: First Pressurizing Step
Second PR: Second Pressurizing Step In the step 1, as specified in FIG. 2, the adsorption step is performed in the adsorption tower A, the scavenging step in the adsorption tower B, and the first depressurizing step in the adsorption tower C. The gas flow is shown in FIG. 3a.

Figure 3A:
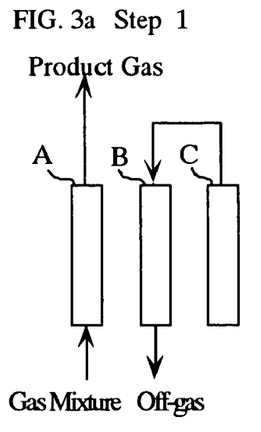
FIGS. 3a to 3i are block diagrams respectively showing the gas flow directions in each of the steps 1 to 9.
Figure 4:
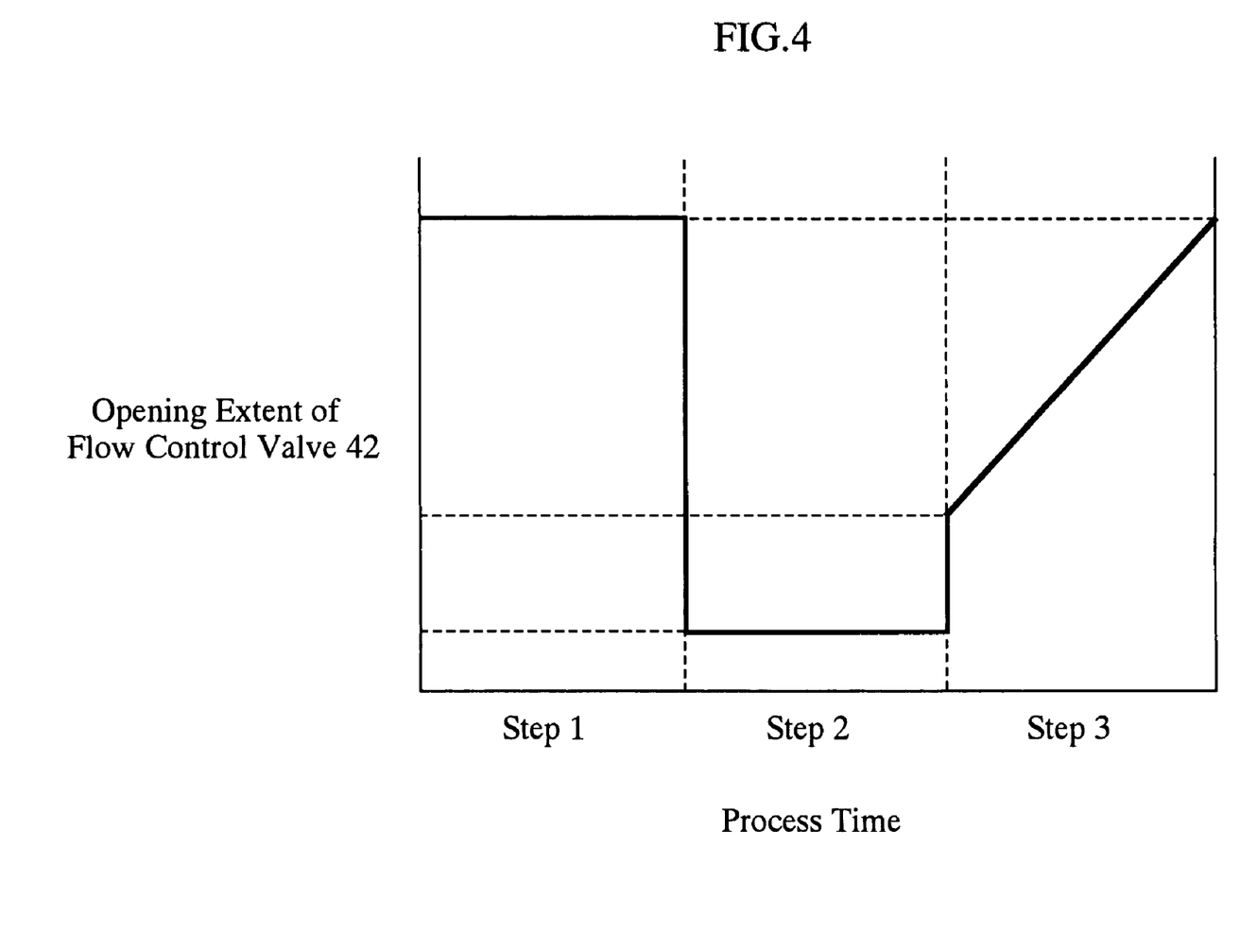
FIG. 4 is a line graph showing a temporal variation in opening extent of the flow control valve that controls the flow rate of the off-gas discharged from the PSA system.

As shown in FIGS. 1 and 3a, the gas mixture is introduced into the adsorption tower A from the reforming unit 11 of the reformer 1, via the gas mixture piping 20 and the automatic valve a. In the adsorption tower A, an unnecessary gas component is removed by the adsorbent, and the product gas is discharged out of the tower. The product gas is collected via the automatic valve i and the product gas piping 21.

To the adsorption tower B, residual gas (scavenging gas) discharged from the adsorption tower C is introduced via the automatic valve n, the residual gas recovery piping 22, the flow control valve 40, the automatic valve p, the gas introduction piping 23 and the automatic valve j. Since the adsorption tower B was formerly performing the desorption step while the adsorption tower C was formerly performing the adsorption step (see the step 9 shown in FIG. 3i), the pressure in the adsorption tower C is higher than in the adsorption tower B. Accordingly, introducing the residual gas in the adsorption tower C into the adsorption tower B depressurizes the inside of the adsorption tower C to a first intermediate pressure, and causes the adsorption tower B to discharge residual gas in the tower. The gas thus discharged is supplied to the combustion unit 10 of the reformer 1, via the automatic valve d, the off-gas feed piping 30 and the flow control valve 42.

When the maximum pressure in the adsorption step is defined as 100% and the minimum pressure in the desorption step is defined as 0%, the first intermediate pressure in the adsorption tower C (the first depressurizing step) lies in a range of 35% to 85%.

In the step 2, as shown in FIG. 2, the adsorption step is performed in the adsorption tower A, the first pressurizing step in the adsorption tower B, and the second depressurizing step in the adsorption tower C. The gas flow is shown in FIG. 3b.

Figure 3B:
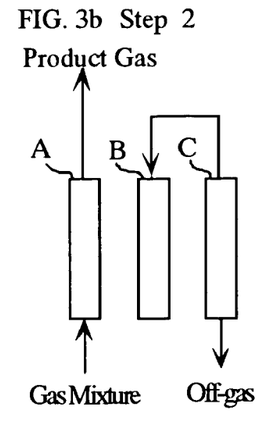

As shown in FIGS. 1 and 3b, the adsorption tower A continues to receive the gas mixture as in the step 1, and discharges the product gas out of the tower. The product gas is collected in a similar manner to the step 1.

The residual gas led out of the adsorption tower C is introduced into the adsorption tower B via the automatic valve n, the residual gas recovery piping 22, the flow control valve 40, the automatic valve p, the gas introduction piping 23 and the automatic valve j, and also supplied to the combustion unit 10 via the automatic valve f, the off-gas feed piping 30 and the flow control valve 42. In other words, in the step 2, while the supply of the off-gas from the adsorption tower B is discontinued because the automatic valve d is closed for equalizing the pressure between the adsorption tower B and the adsorption tower C, the automatic valve f is opened so that the off-gas is supplied to the combustion unit 10 from the adsorption tower C, via the automatic valve f, the off-gas feed piping 30 and the flow control valve 42. Therefore, the combustion unit 10 can continue to receive the off-gas as in the step 1, without interruption. Also, the inside of the adsorption tower C is further depressurized to a second intermediate pressure, which is lower than the first intermediate pressure, and the inside of the adsorption tower B is pressurized.

When the maximum pressure in the adsorption step is defined as 100% and the minimum pressure in the desorption step is defined as 0%, the second intermediate pressure in the adsorption tower C (the second depressurizing step) lies in a range of 50% to 15%.

In the step 3, as specified in FIG. 2, the adsorption step is performed in the adsorption tower A, the second pressurizing step in the adsorption tower B, and the desorption step in the adsorption tower C. The gas flows is shown in FIG. 3c.

Figure 3C:
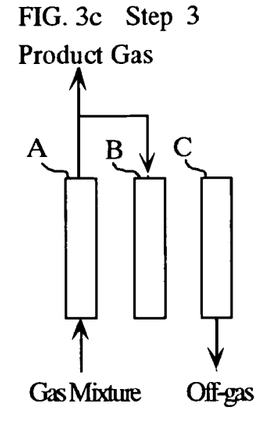
Figure 3D:
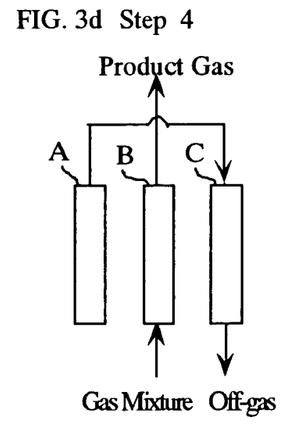
Figure 3E:
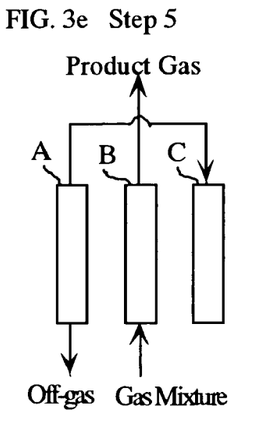
Figure 3F:
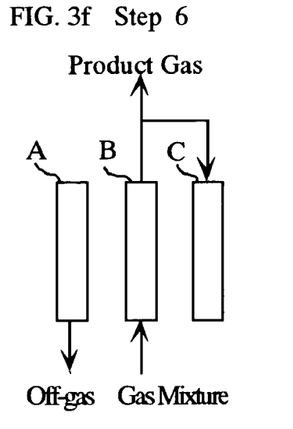
Figure 3G:
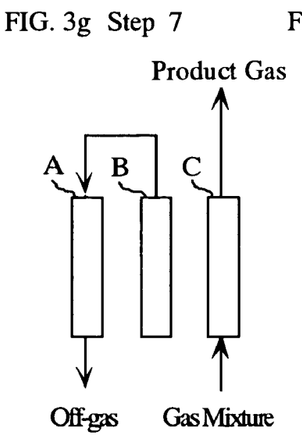
Figure 3H:
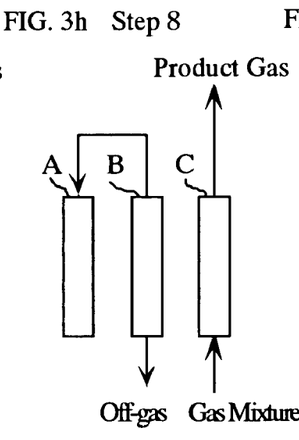
Figure 3I:
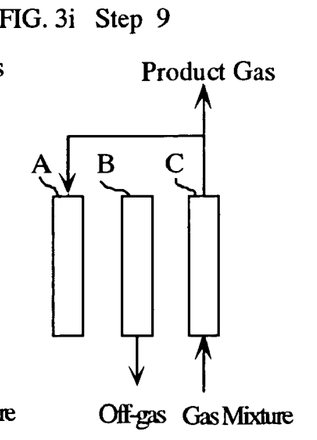

As shown in FIGS. 1 and 3c, the adsorption tower A still continues to receive the gas mixture as in the steps 1 and 2, and discharges the product gas out of the tower. The product gas is collected in a similar manner to the step 1, while a portion thereof is introduced to the adsorption tower B via the product gas reverse flow piping 24, the automatic valve q, the flow control valve 41, the gas introduction piping 23 and the automatic valve j, so that the inside of the adsorption tower B is further pressurized.

In the adsorption tower C, as specified in FIG. 2, the automatic valves e, m, n, o are closed while the automatic valve f is opened, so that the off-gas (containing the unnecessary gas component desorbing from the adsorbent) is discharged out of the tower until the pressure drops to the minimum pressure in the desorption step. The off-gas thus discharged is supplied to the combustion unit 10 via the automatic valve f, the off-gas feed piping 30 and the flow control valve 42. Therefore, the combustion unit 10 continues to receive the off-gas as in the step 2, without interruption.

Through the steps 4 to 6, as shown in FIGS. 2 and 3d to 3f, the first depressurizing step, the second depressurizing step and the desorption step are successively performed in the adsorption tower A, as in the adsorption tower C through the steps 1 to 3. In the adsorption tower B, the adsorption step is continued as in the adsorption tower A through the steps 1 to 3. In the adsorption tower C, the scavenging step, the first pressurizing step and the second pressurizing step are successively performed as in the adsorption tower B through the steps 1 to 3.

Through the steps 7 to 9 as shown in FIGS. 2 and 3g to 3i, the scavenging step, the first pressurizing step and the second pressurizing step are successively performed in the adsorption tower A, as in the adsorption tower B through the steps 1 to 3. In the adsorption tower B, the first depressurizing step, the second pressurizing step and the desorption step are successively performed, as in the adsorption tower C through the steps 1 to 3. In the adsorption tower C, the adsorption step is continued as in the adsorption tower A through the steps 1 to 3.

Repeating the foregoing steps 1 to 9 in the adsorption towers A, B, C leads to removal of the unnecessary gas component from the gas mixture, and to continuous extraction of the product gas containing a high concentration of the target gas, and allows the off-gas to be constantly discharged from at least one of the adsorption towers A, B, C. Accordingly, the off-gas can be continuously supplied to the combustion unit 10 without interruption. Consequently, the PSA system X1 according to the first embodiment does not have to include an off-gas reservoir tank which requires a large mounting space, and can thereby achieve a reduction in dimensions of the system X1. In addition, when the target gas is hydrogen gas, it is preferable that the gas mixture contains hydrogen gas and a flammable gas component other than hydrogen gas.

Figure 5:
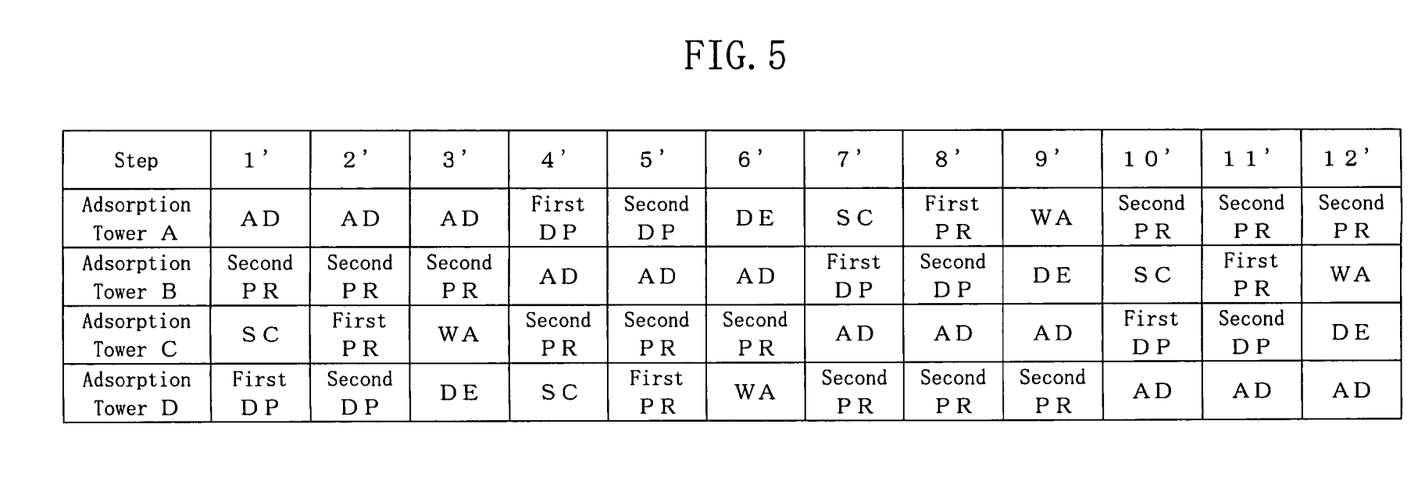
FIG. 5 is a cross-reference table specifying a timing of the process performed in the respective adsorption towers, with respect to steps 1' to 12' for enriching and separating the target gas, with a quadruple-tower PSA system for carrying out an off-gas feeding method according to a second embodiment of the present invention.

Referring now to FIGS. 5 and 6a to 6l, an off-gas feeding method according to a second embodiment of the present invention will be described hereunder. FIG. 5 specifies the process performed in the respective adsorption towers in each of the steps 1' to 12' to be described later. FIGS. 6a to 6l schematically illustrate directions of gas flow in each step included in the target gas enriching and separating process. A structural difference between the PSA system according to the second embodiment and the PSA system X1 according to the first embodiment lies in that an adsorption tower D has been added, thus to constitute a quadruple-tower system. Although the addition of the adsorption tower D incurs minor modifications such as the addition of the automatic valves, the configuration of the remaining portion is similar to that of the first embodiment, and therefore detailed description will be omitted with respect to the structure of the system and the open/close status of the valves in each step according to the second embodiment.

In FIG. 5, the following abbreviations are used.
AD: Adsorption Step
First DP: First Depressurizing Step
Second DP: Second Depressurizing Step
DE: Desorption Step
SC: Scavenging Step
First PR: First Pressurizing Step
Second PR: Second Pressurizing Step
WA: Waiting step According to the second embodiment, each of the adsorption towers A, B, C, D repeats the cycle which includes an adsorption step, a first depressurizing step, a second depressurizing step, a desorption step, a scavenging step, a first pressurizing step, a waiting step and a second pressurizing step. More specifically, these process steps (step 1' to 12') are performed in a timing specified in FIG. 5, in each of the adsorption towers A, B, C, D.

In the step 1', as specified in FIG. 5, the adsorption step is performed in the adsorption tower A, the second pressurizing step in the adsorption tower B, the scavenging step in the adsorption tower C, and the first depressurizing step in the adsorption tower D. The gas flow is shown in FIG. 6a.

Figure 6A:
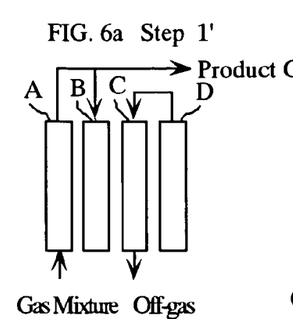
FIGS. 6a to 6l are block diagrams respectively showing the gas flow directions in each of the steps 1' to 12'.

As shown in FIG. 6a, the adsorption tower A receives a gas mixture from a reformer (not shown). In the adsorption tower A, an unnecessary gas component is removed by the adsorbent, and a product gas is discharged out of the tower, and collected. A portion of the product gas is introduced into the adsorption tower B, so as to pressurize the inside of the adsorption tower B.

To the adsorption tower C, residual gas (scavenging gas) discharged from the adsorption tower D is introduced. Since the adsorption tower C was formerly performing the desorption step while the adsorption tower D was formerly performing the adsorption step (see the step 12' to be described later, shown in FIG. 6l), the pressure in the adsorption tower D is higher than in the adsorption tower C. Accordingly, introducing the residual gas in the adsorption tower D into the adsorption tower C depressurizes the inside of the adsorption tower D to a first intermediate pressure, and causes the adsorption tower C to discharge the residual gas in the tower. The off-gas thus discharged is supplied to the combustion unit (not shown).

When the maximum pressure in the adsorption step is defined as 100% and the minimum pressure in the desorption step is defined as 0%, the first intermediate pressure in the adsorption tower D (the first depressurizing step) lies in a range of 35% to 85%.

In the step 2', as specified in FIG. 5, the adsorption step is performed in the adsorption tower A, the second pressurizing step in the adsorption tower B, the first pressurizing step in the adsorption tower C, and the second depressurizing step in the adsorption tower D. The gas flow is shown in FIG. 6b.

Figure 6B:
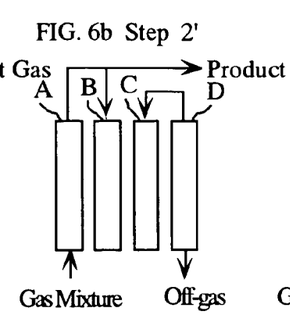

As shown in FIG. 6b, the adsorption tower A continues to receive the gas mixture as in the step 1', and discharges the product gas out of the tower. The product gas is collected in a similar manner to the step 1. Also, a portion of the product gas is continuously introduced into the adsorption tower B, so that the inside of the adsorption tower B is pressurized.

The residual gas led out of the adsorption tower D is introduced into the adsorption tower C, and also supplied to the combustion unit (not shown). In other words, in the step 2', while the supply of the off-gas from the adsorption tower C is discontinued for equalizing the pressure between the adsorption tower C and the adsorption tower D, the off-gas is supplied to the combustion unit (not shown) from the adsorption tower D. Therefore, the combustion unit can continue to receive the off-gas, without interruption. Also, because of such arrangement the inside of the adsorption tower D is further depressurized to a second intermediate pressure, which is lower than the first intermediate pressure, and the inside of the adsorption tower C is pressurized.

When the maximum pressure in the adsorption step is defined as 100% and the minimum pressure in the desorption step is defined as 0%, the second intermediate pressure in the adsorption tower D (the second depressurizing step) lies in a range of 50% to 15%.

In the step 3', as specified in FIG. 5, the adsorption step is performed in the adsorption tower A, the second pressurizing step in the adsorption tower B, the waiting step in the adsorption tower C, and the desorption step in the adsorption tower D. The gas flow is shown in FIG. 6c.

Figure 6C:
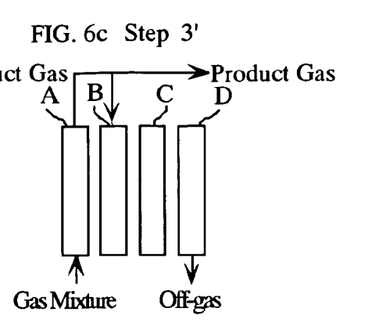
Figure 6D:
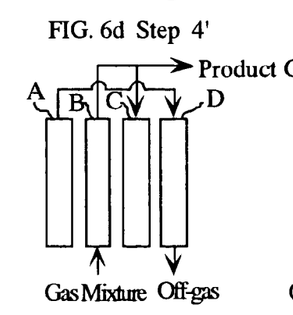
Figure 6E:
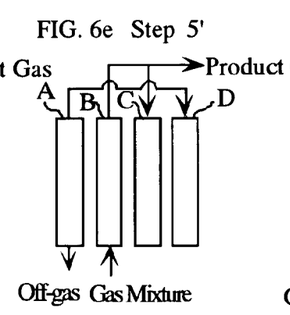
Figure 6F:
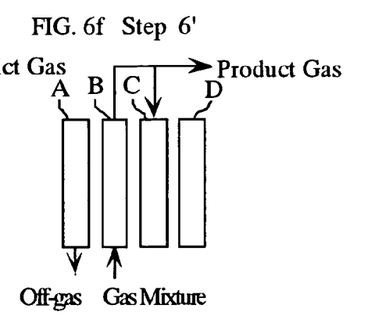
Figure 6G:
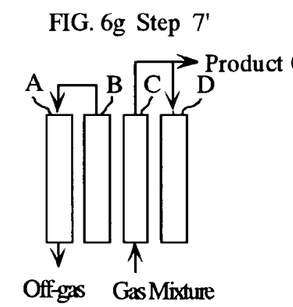
Figure 6H:
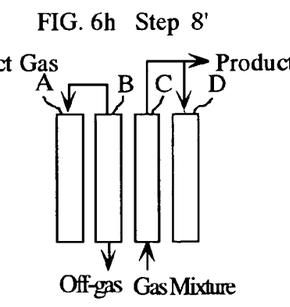
Figure 6I:
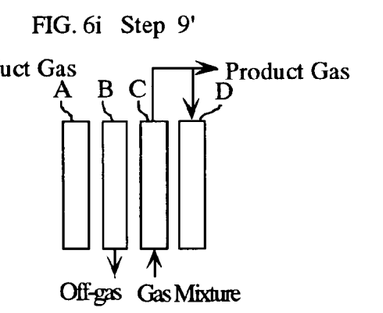
Figure 6J:
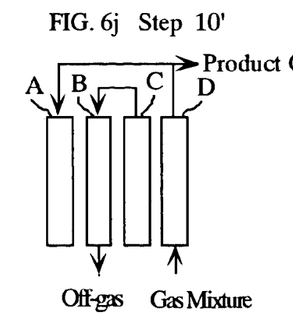
Figure 6K:
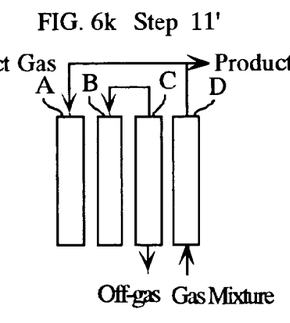
Figure 6L:
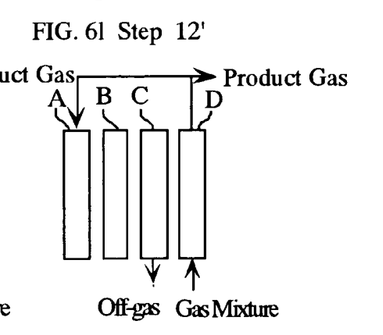

As shown in FIG. 6c, the adsorption tower A still continues to receive the gas mixture as in the steps 1' and 2', and discharges the product gas out of the tower. The product gas is collected in a similar manner to the step 1'. Also, a portion of the product gas is introduced to the adsorption tower B, so that the inside of the adsorption tower B is pressurized.

In the adsorption tower D, the off-gas (including the unnecessary gas component removed from the adsorbent) is discharged out of the tower until the pressure drops to the minimum pressure in the desorption step. The off-gas thus discharged is supplied to the combustion unit (not shown). Meanwhile, the adsorption tower C is kept waiting, without receiving or discharging the gas.

Through the steps 4' to 6', as shown in FIGS. 5 and 6d to 6f, the first depressurizing step, the second depressurizing step and the desorption step are successively performed in the adsorption tower A, as in the adsorption tower D through the steps 1' to 3'. In the adsorption tower B, the adsorption step is continued as in the adsorption tower A through the steps 1' to 3'. In the adsorption tower C, the second pressurizing step is continued as in the adsorption tower B through the steps 1' to 3'. In the adsorption tower D, the scavenging step, the first pressurizing step and the waiting step are successively performed as in the adsorption tower C through the steps 1' to 3'.

Through the steps 7' to 9' as shown in FIGS. 5 and 6g to 6i, the scavenging step, the first pressurizing step and the waiting step are successively performed in the adsorption tower A, as in the adsorption tower C through the steps 1' to 3'. In the adsorption tower B, the first depressurizing step, the second pressurizing step and the desorption step are successively performed as in the adsorption tower D through the steps 1' to 3'. In the adsorption tower C, the adsorption step is continued as in the adsorption tower A through the steps 1' to 3'. In the adsorption tower D, the second depressurizing step is continued as in the adsorption tower B through the steps 1' to 3'.

Through the steps 10' to 12' as shown in FIGS. 5 and 6j to 6l, the second pressurizing step is continued in the adsorption tower A, as in the adsorption tower B through the steps 1' to 3'. In the adsorption tower B, the scavenging step, the first pressurizing step and the waiting step are successively performed, as in the adsorption tower C through the steps 1' to 3'. In the adsorption tower C, the first depressurizing step, the second depressurizing step and the desorption step are successively performed, as in the adsorption tower D through the steps 1' to 3'. In the adsorption tower D, the adsorption step is continued as in the adsorption tower A through the steps 1' to 3'.

Repeating the foregoing steps 1' to 12' in the adsorption towers A, B, C, D leads to removal of the unnecessary gas component from the gas mixture, and to continuous extraction of the product gas containing a high concentration of the target gas. Also since the off-gas is constantly discharged from at least one of the adsorption towers A, B, C, D, the off-gas can be continuously supplied to the combustion unit (not shown) without interruption. Consequently, the PSA system according to the second embodiment does not have to include an off-gas reservoir tank which requires a large footprint, and can thereby achieve a reduction in dimensions of the system. In addition, when the target gas is hydrogen gas, it is preferable that the gas mixture contains the hydrogen gas and a flammable gas component other than the hydrogen gas.

Although the present invention has been described in details based on the specific embodiments, it is to be understood that the present invention is not limited to the foregoing embodiments, but that various modifications may be made without departing from the spirit and scope of the present invention.

The invention claimed is:

1. An off-gas feeding method for supplying off-gas discharged from a plurality of adsorption towers to an off-gas consumption unit, while performing a pressure swing adsorption process of repeating a cycle including a plurality of steps, to enrich and separate target gas out of a gas mixture in the adsorption towers loaded with an adsorbent, comprising:
    causing at least one of the adsorption towers to discharge the off-gas, in all the steps included in the cycle, so as to continue to supply the off-gas to the off-gas consumption unit without interruption;
    wherein each of the adsorption towers repeats the cycle which includes: an adsorption step of adsorbing an unnecessary gas component in the gas mixture with the adsorbent so as to discharge a product gas containing a higher concentration of the target gas, a first depressurizing step of reducing the pressure in the adsorption tower to a first intermediate pressure, a second depressurizing step of reducing the pressure in the adsorption tower to a second intermediate pressure, a desorption step of desorbing and discharging the unnecessary gas component from the adsorbent, a scavenging step of introducing scavenging gas into the adsorption tower so as to discharge residual gas in the tower, and a pressurizing step of increasing the pressure in the adsorption tower; and
    wherein the residual gas discharged through a product gas outlet of the adsorption tower performing the second depressurizing step is introduced to another adsorption tower performing the pressurizing step, and the off-gas is supplied to the off-gas consumption unit through a gas mixture inlet of the adsorption tower performing the second depressurizing step.

2. The method according to claim 1, further comprising controlling a flow rate of the off-gas supplied to the off-gas consumption unit.

3. The method according to claim 2, wherein the step of controlling the flow rate of the off-gas supplied to the off-gas consumption unit includes adjusting an opening extent of a flow control valve located in a gas flow path connecting the respective adsorption towers to the off-gas consumption unit.

4. The method according to claim 1, wherein the adsorption towers supply the off-gas to the off-gas consumption unit during the second depressurizing step, the desorption step and the scavenging step.

5. The method according to claim 4, further comprising controlling a flow rate of the off-gas supplied to the off-gas consumption unit by a flow control valve located in a gas flow path connecting the adsorption towers to the off-gas consumption unit, wherein an opening extent of the flow control valve is set to be largest in the scavenging step and smallest in the second depressurizing step while gradually increasing in the desorption step.

6. An off-gas feeding method for supplying off-gas discharged from a plurality of adsorption towers to an off-gas consumption unit, while performing a pressure swing adsorption process of repeating a cycle including a plurality of steps, to enrich and separate target gas out of a gas mixture in the adsorption towers loaded with an adsorbent, comprising:

causing at least one of the adsorption towers to discharge the off-gas, in all the steps included in the cycle, so as to continue to supply the off-gas to the off-gas consumption unit without interruption;

wherein each of the adsorption towers repeats the cycle which includes: an adsorption step of adsorbing an unnecessary gas component in the gas mixture with the adsorbent so as to discharge a product gas containing a higher concentration of the target gas, a first depressurizing step of reducing the pressure in the adsorption tower to a first intermediate pressure, a second depressurizing step of reducing the pressure in the adsorption tower to a second intermediate pressure, a desorption step of desorbing and discharging the unnecessary gas component from the adsorbent, a scavenging step of introducing scavenging gas into the adsorption tower so as to discharge residual gas in the tower, a first pressurizing step of increasing the pressure in the adsorption tower, a waiting step of closing both of the gas mixture inlet and the product gas outlet of the adsorption tower, and a second pressurizing step of further increasing the pressure in the adsorption tower;

wherein the residual gas discharged through a product gas outlet of the adsorption tower performing the second depressurizing step is introduced to another adsorption tower performing the first pressurizing step, and the off-gas is supplied to the off-gas consumption unit through a gas mixture inlet of the adsorption tower performing the second depressurizing step.

7. The method according to claim 1, further comprising utilizing the off-gas consumption unit as a combustion unit of a reformer that produces the gas mixture.

8. The method according to claim 1, wherein the target gas is hydrogen gas, and the gas mixture contains hydrogen gas and a flammable gas component other than hydrogen gas.

9. The method according to claim 6, further comprising utilizing the off-gas consumption unit as a combustion unit of a reformer that produces the gas mixture.

10. The method according to claim 6, wherein the target gas is hydrogen gas, and the gas mixture contains hydrogen gas and a flammable gas component other than hydrogen gas.

* * * * *